(12) United States Patent

Sukegawa et al.

(10) Patent No.: US 12,605,973 B2

(45) Date of Patent: Apr. 21, 2026

(54) TIRE

(71) Applicant: BRIDGESTONE CORPORATION, Tokyo (JP)

(72) Inventors: Shin Sukegawa, Tokyo (JP); Hironori Hoshino, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 53 days.

(21) Appl. No.: 18/707,882

(22) PCT Filed: May 11, 2022

(86) PCT No.: PCT/JP2022/019975

§ 371 (c)(1),
(2) Date: May 7, 2024

(87) PCT Pub. No.: WO2023/105812

PCT Pub. Date: Jun. 15, 2023

(65) Prior Publication Data

US 2025/0170859 A1      May 29, 2025

(30) Foreign Application Priority Data

Dec. 9, 2021 (JP) ................................. 2021-200154

(51) Int. Cl.
*B60C 19/00* (2006.01)
*B60C 13/00* (2006.01)
*B60C 23/04* (2006.01)

(52) U.S. Cl.
CPC ........... *B60C 19/00* (2013.01); *B60C 13/001* (2013.01); *B60C 23/0493* (2013.01); *B60C 2019/004* (2013.01)

(58) Field of Classification Search
None
See application file for complete search history.

(56) References Cited

U.S. PATENT DOCUMENTS

| | | | |
|---|---|---|---|
| 8,004,408 | B2 | 8/2011 | Shimura |
| 8,091,808 | B2 | 1/2012 | Higginson et al. |
| 8,833,409 | B2 | 9/2014 | Kleckner |
| 10,766,317 | B2 | 9/2020 | Tanno et al. |
| 2008/0246588 | A1 | 10/2008 | Shimura |

(Continued)

FOREIGN PATENT DOCUMENTS

| | | | |
|---|---|---|---|
| DE | 10 2018 202 249 A1 * | 8/2019 | |
| JP | 2002205516 A | 7/2002 | |

(Continued)

OTHER PUBLICATIONS

Extended European Search Report, Feb. 25, 2025, for corresponding European application 22 903 750.2.*

(Continued)

*Primary Examiner* — Adrienne C. Johnstone

(74) *Attorney, Agent, or Firm* — KENJA IP LAW PC

(57) ABSTRACT

A tire that can indicate an area in which an electronic tag is embedded is provided. A tire includes an electronic tag disposed inside from a surface, and an indicator indicating the position of the electronic tag. The indicator is disposed in or on the surface, and formed in an area encompassing a projection image of the shape of the electronic tag onto the surface.

8 Claims, 11 Drawing Sheets

(56)         References Cited

U.S. PATENT DOCUMENTS

| | | |
|---|---|---|
| 2009/0128296 A1 | 5/2009 | Han et al. |
| 2015/0075693 A1 | 3/2015 | Dorfi et al. |
| 2018/0137533 A1 | 5/2018 | Pilarz |
| 2020/0070597 A1 | 3/2020 | Noel et al. |

FOREIGN PATENT DOCUMENTS

| | | |
|---|---|---|
| JP | 2004148953 A | 5/2004 |
| JP | 2006056443 A | 3/2006 |
| JP | 4487125 B2 | 6/2010 |
| JP | 2011121587 A | 6/2011 |
| JP | 2013512134 A | 4/2013 |
| WO | 2005095127 A1 | 10/2005 |
| WO | 2006022218 A1 | 3/2006 |
| WO | 2015083726 A1 | 6/2015 |

OTHER PUBLICATIONS

Jul. 26, 2022, International Search Report issued in the International Patent Application No. PCT/JP2022/019975.

Jun. 5, 2024, International Preliminary Report on Patentability issued in the International Patent Application No. PCT/JP2022/019975.

Feb. 25, 2025, search result of the Extended European Search Report issued by the European Patent Office in the corresponding European Patent Application No. 22903750.2.

\* cited by examiner

*FIG. 10*

TIRE

TECHNICAL FIELD

The present disclosure relates to a tire.

BACKGROUND

Patent Literature (PTL) 1 describes a pneumatic tire equipped with a transponder. The transponder is capable of providing various information regarding the tire and data on the tire in use. In this tire, the transponder has a transmitting and receiving function and a storage function, and is disposed, for example, on a sidewall portion. An identification label indicating the position of the transponder is provided on a tire outer surface of the sidewall portion on which the transponder is disposed or a tire outer surface of a sidewall portion on the opposite side of the sidewall portion on which the transponder is disposed. The identification label indicating the position of the transponder is distinguished from other portions based on color or shape. When the color of the identification label is different from the color of the tire outer surface, any of saturation, brightness, and hue may differ. When the identification label is in a three-dimensional shape, a concave shape depressed from the tire outer surface, a convex shape protruding from the tire outer surface, a combination of concave and convex shapes, or the like is employed.

PTL 2 describes a method for processing rubber materials including rubber from rubber-containing products such as tires. PTL 2 states that the rubber-containing products, such as tires, are processed by separating rubber from other materials.

CITATION LIST

Patent Literature

PTL 1: JP 2006-056443 A
PTL 2: JP 2013-512134 A

SUMMARY

Technical Problem

For example, as described in PTL 1, an electronic chip (so-called electronic tag or RFID tag, hereinafter simply referred to as "electronic tag") that functions as a transponder may be installed within a tire or on an inner surface of a tire. The electronic chip may then be able to provide information regarding the tire to an external terminal through communication with the electronic chip. This makes it easy to obtain a tire model, information on distribution and sales, a usage history, driving information on a vehicle on which the tire is mounted, and the like, to acquire, from the tire, information necessary for recycling the tire (e.g., information regarding constituent materials of the tire), and to manage traceability of the tire for proper disposal and recycling. Indicating the position of the electronic tag on an outer surface of the tire is convenient for acquiring information by a terminal device, which acquires information from the electronic tag, because where to hold a sensor can be recognized by the indication. It is also convenient when the electronic tag is separated from the tire in a separation process for disposal or recycling of the tire because the position of the electronic tag can be known.

Here, when the electronic tag is embedded within the tire, it may be necessary to hollow out the tire to remove and separate the electronic tag. Therefore, it is desirable to be able to recognize an area in which the electronic tag is installed, as the position of the electronic tag.

The present disclosure is made in view of such circumstances. It would be helpful to provide a tire that can indicate an area in which an electronic tag is embedded.

Solution to Problem

A tire according to the present disclosure to achieve the above object includes:
an electronic tag disposed inside from a surface; and
an indicator indicating the position of the electronic tag, wherein the indicator is:
disposed in or on the surface, and
formed in an area encompassing a projection image of the shape of the electronic tag onto the surface.

Advantageous Effect

According to the present disclosure, it is possible to provide a tire that can indicate an area in which an electronic tag is embedded.

BRIEF DESCRIPTION OF THE DRAWINGS

In the accompanying drawings:
FIG. 10 is a diagram illustrating, with enlargement, the vicinity of an indicator in a sidewall portion of another tire.

DETAILED DESCRIPTION

Tires according to embodiments of the present disclosure will be described based on the drawings.

First Embodiment

Figure 1:
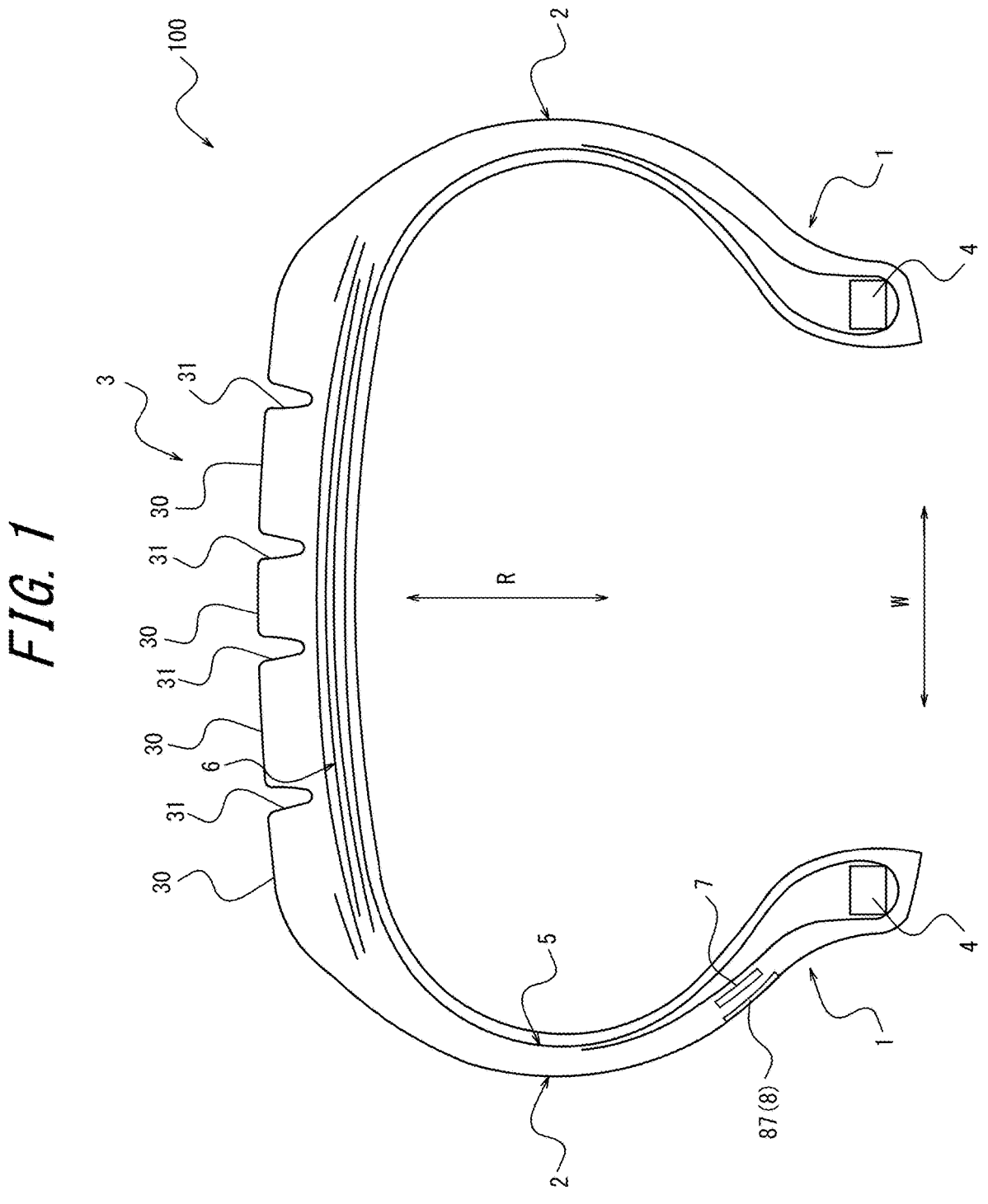
FIG. 1 is a cross-sectional view of a tire according to a first embodiment, in a cross-section intersecting a circumferential direction of the tire and in a cross-section of a part including a tag and an indicator.
Figure 2:
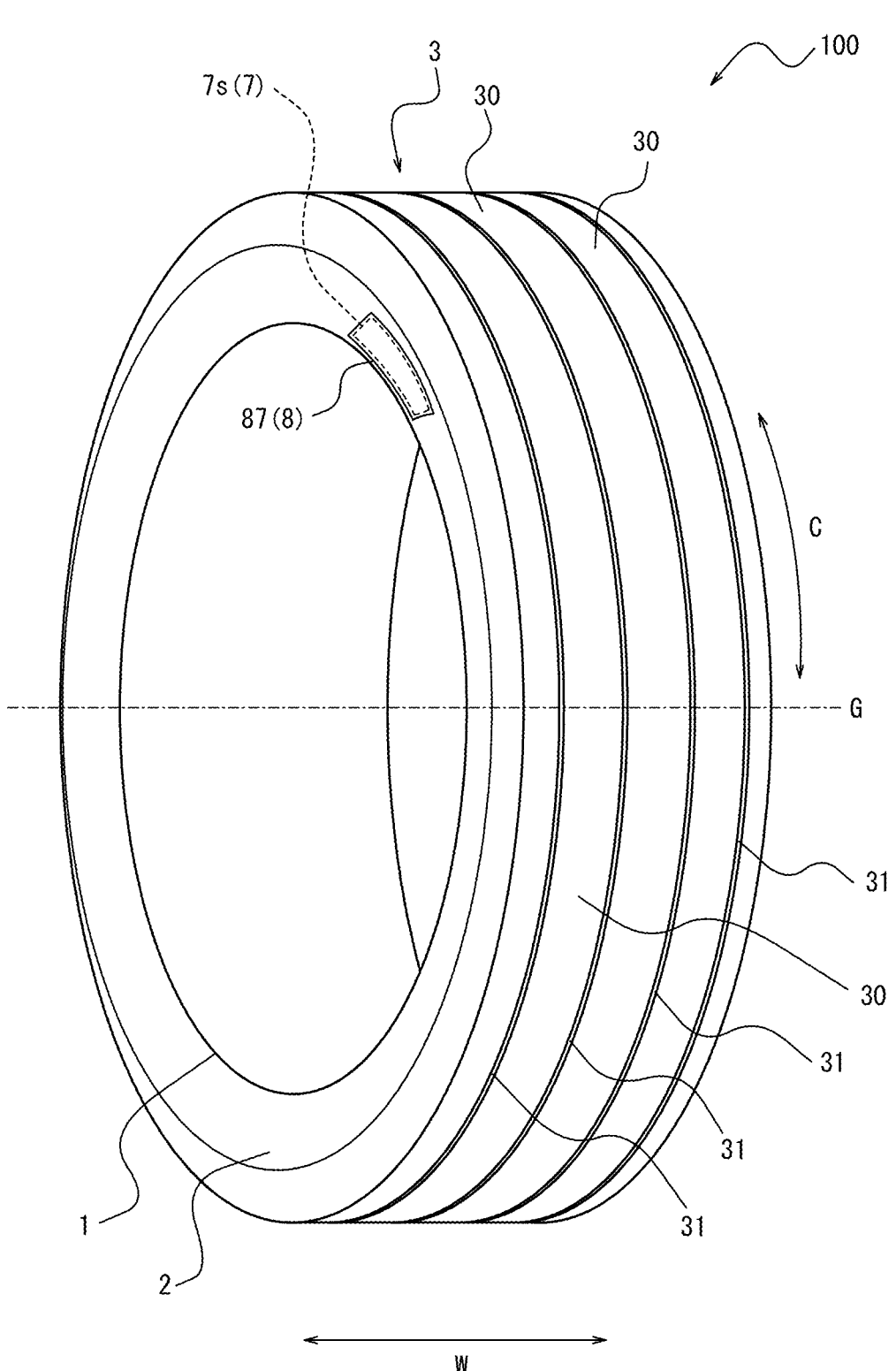
FIG. 2 is a perspective view of the tire according to the first embodiment.

FIGS. 1 and 2 illustrate a tire 100 of this embodiment. FIG. 1 illustrates a cross-section of the tire 100 intersecting a circumferential direction C (see FIG. 2). FIG. 2 is a perspective view of the tire 100. As illustrated in FIG. 1, the tire 100 includes an electronic tag 7 (hereinafter referred to as tag 7) disposed inside from a surface of the tire 100, and an indicator 8 indicating the position of the tag 7. One example of the tag 7 is a so-called RFID tag, which is an electronic circuit device or electronic chip that includes an antenna circuit for establishing communication, a storage circuit, and a control circuit. The tire 100 will be described in detail below.

As illustrated in FIGS. 1 and 2, the tire 100 includes bead portions 1, which are disposed on the sides of the tire 100 and secure the tire 100 to a rim, sidewall portions 2, which constitute the sides of the tire 100, and a tread portion 3, which contacts a road surface.

As illustrated in FIG. 2, the tire 100 is formed in the shape of an approximately circular annulus centered on an axial center G. That is, the tread portion 3, the sidewall portions 2, and the bead portions 1 are in the shapes of approximately circular annuluses that are centered in common on the axial center G.

In the following description, a width direction W, the circumferential direction C (see FIG. 2), and a radial direction R of the tire 100 illustrated in FIGS. 1 and 2 have the same meaning as a width direction, a circumferential direction, and a radial direction of the tread portion 3. In the radial direction R, an outside of the annulus is referred to as a radial outside, and an inside of the annulus is referred to as a radial inside.

As illustrated in FIG. 1, the tire 100 includes, as its internal structure, a carcass 5, which is a cord layer forming a skeleton of the tire 100, bead cores 4, which are internal skeletons of the bead portions 1 and support the carcass 5, and belts 6, which are reinforcement belts stretched along the circumferential direction C between a surface of the tread portion 3 and the carcass 5.

The bead portions 1, the sidewall portions 2, and the tread portion 3 each contain synthetic rubber. The synthetic rubber of the bead portions 1 and the sidewall portions 2 is referred to as side rubber. The synthetic rubber of the tread portion 3 is referred to as tread rubber. The bead cores 4, the carcass 5, and the belts 6 are embedded in the side rubber and the tread rubber. In the tire 100, radial outside ends of the sidewall portions 2 are integrally connected to both ends of the tread portion 3 in the width direction W. The bead portions 1 are integrally connected to radial inside ends of the sidewall portions 2. In other words, the cross-section of the tire 100 intersecting the circumferential direction C is in the shape of the letter C of the alphabet. The surface of the tire 100 in this embodiment refers to an outside surface (hereinafter also referred to as outer surface) and an inside surface (hereinafter also referred to as inner surface) of the C-shaped arc in the C-shape of the tire 100.

As illustrated in FIGS. 1 and 2, the tread portion 3 is formed with a tread pattern, which has a plurality of convex portions 30 (an example of a tread surface) whose outer circumferential surfaces contact the road surface and a plurality of concave portions 31 that is concave radially inside relative to the convex portions 30. The concave portions 31 are, for example, circumferential grooves. Note that, the outer circumferential surfaces constitute a radial outside surface of the tread portion 3 in the tire 100.

The tire 100 in this embodiment further includes the tag 7 and the indicator 8, as described above. The cross-section of the tire 100 illustrated in FIG. 1 is a cross-section of the tire 100 viewed along the circumferential direction C (see FIG. 2), and is a cross-section of a part including the tag 7 and the indicator 8.

FIGS. 1 and 2 illustrate a case in which the tag 7 is disposed within the tire 100 (inside from the surface), on a side closer to the bead portion 1 in one of the sidewall portions 2, and is disposed outside from the carcass 5 (see FIG. 2) in the width direction W of the tire 100. In other words, the tag 7 is embedded (disposed) in the side of the tire 100. Note that, the outside in the width direction W refers to the same side as the sidewall portion 2 side, viewed from the tread portion 3.

Figure 3:
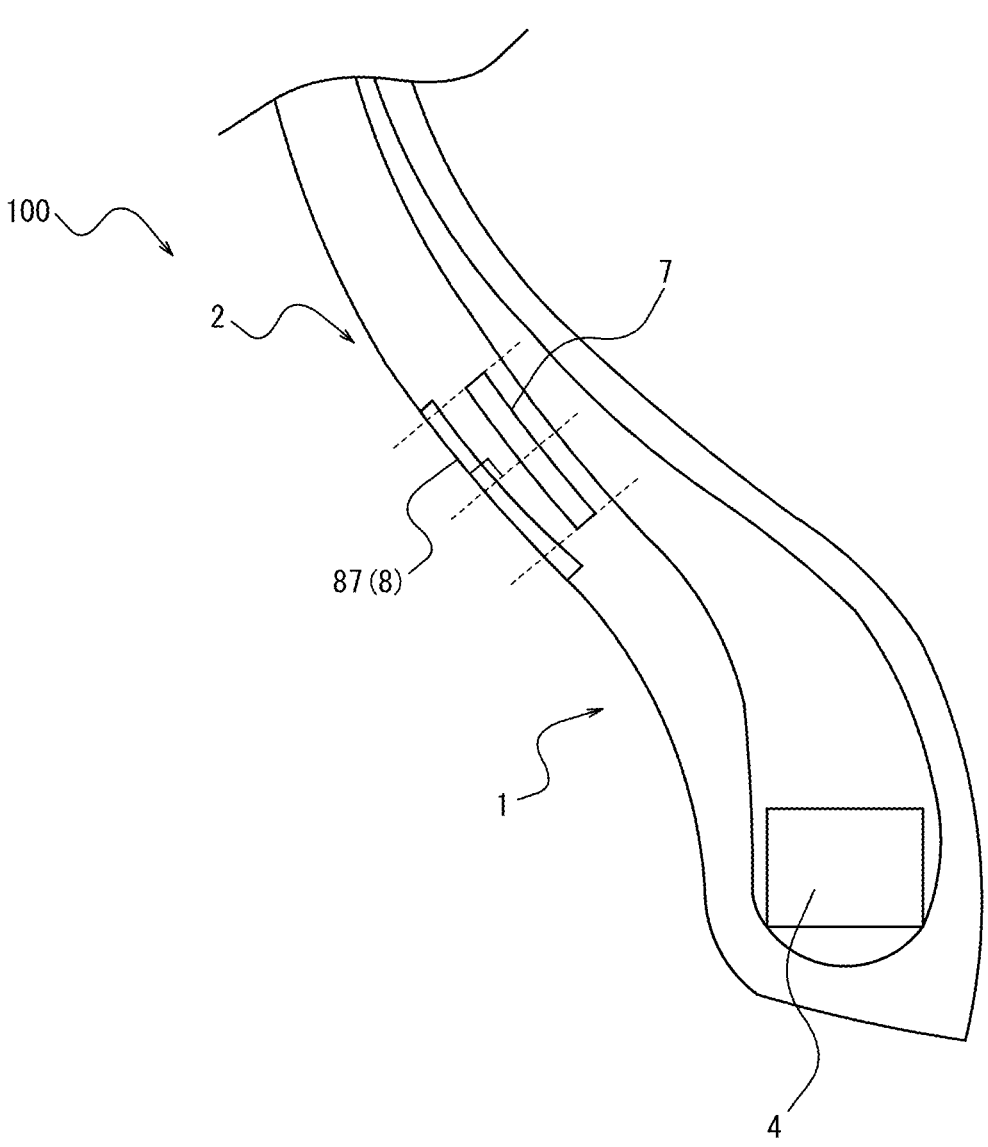
FIG. 3 is an enlarged cross-sectional view of a part of a sidewall portion, in the cross-sectional view of FIG. 1.

FIG. 3 illustrates an enlarged cross-sectional view of a part of the sidewall portion 2, in the cross-sectional view illustrated in FIG. 1. As illustrated in FIG. 3, the indicator 8 is formed in the sidewall portion 2.

As illustrated in FIG. 3, the indicator 8 is disposed in such a position that the normal from the position of the tag 7 to an outer surface of the sidewall portion 2, which is the outer surface of the tire 100 closest to the tag 7, intersects the said outer surface. This allows the indicator 8 to clearly indicate an area in which the tag 7 is embedded. This facilitates removal of the tag 7 when the tire 100 is disposed of or recycled. In a case in which a worker performs communication with the tag 7 using a terminal device, the indicator 8 can indicate the position of the tag 7 to the worker, so that the worker can easily recognize the position of the tag 7 and smoothly perform communication with the tag 7.

Figure 4:
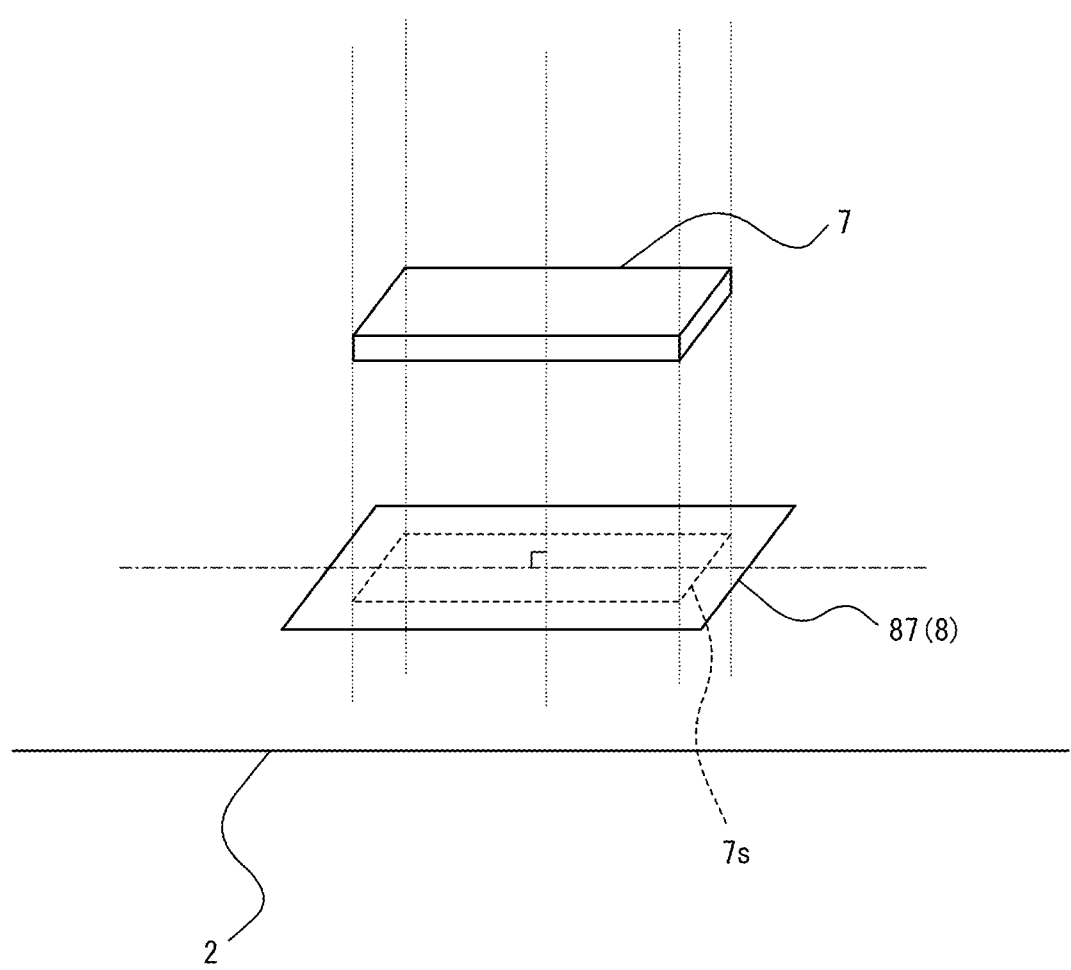
FIG. 4 is a schematic diagram illustrating the positional relationship between the tag and the indicator.
Figure 5:
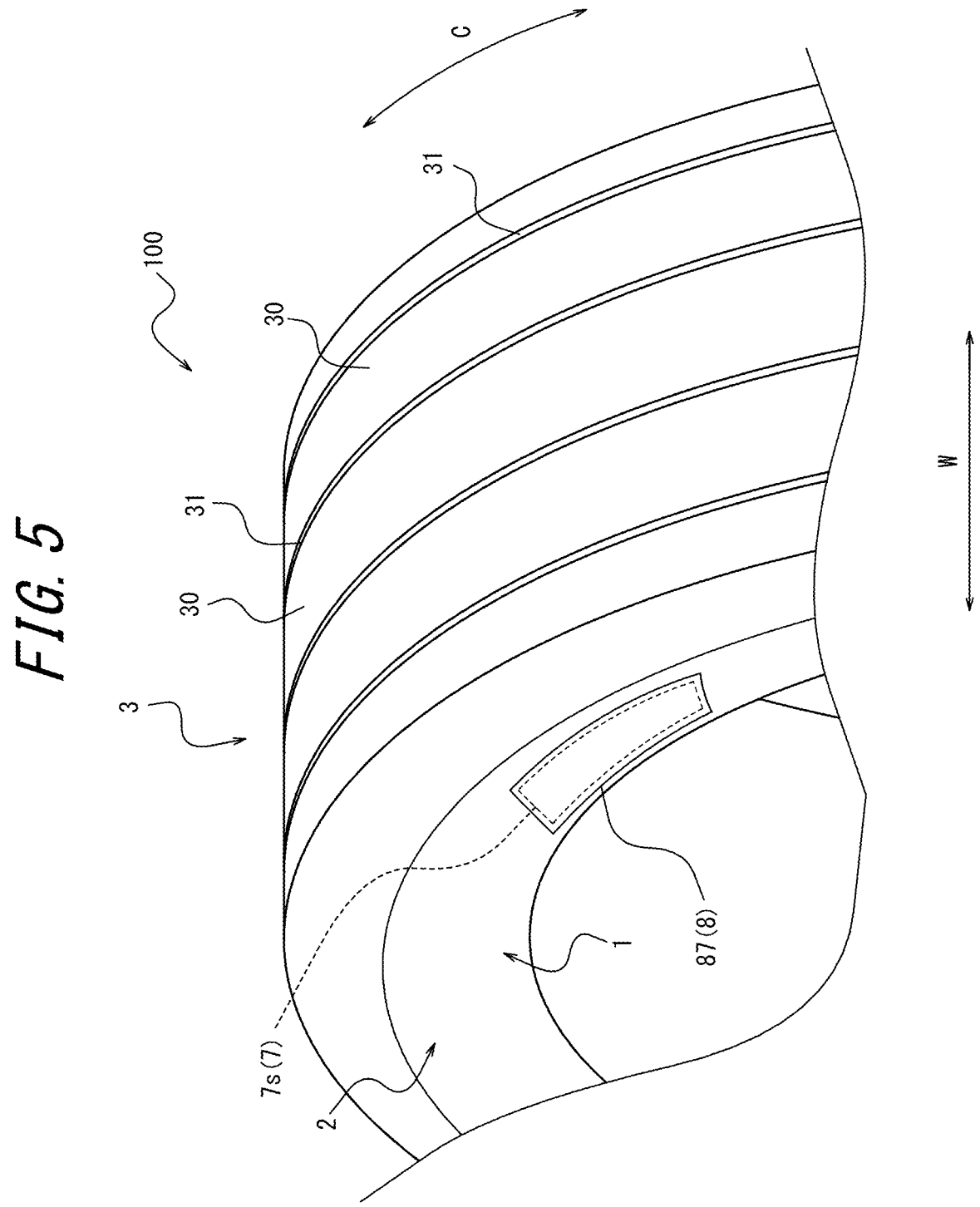
FIG. 5 is an enlarged diagram of FIG. 2, which illustrates, with enlargement, the vicinity of the indicator disposed in the sidewall portion.

The position of the indicator 8 will be described in detail based on FIGS. 2, 4, and 5. FIG. 4 is a schematic diagram illustrating the positional relationship between the tag 7 and the indicator 8, for the purpose of illustrating the position of installation of the indicator 8. FIG. 5 is an enlarged diagram of FIG. 2, which illustrates, with enlargement, the vicinity of the indicator 8 disposed in the sidewall portion 2. In FIGS. 2, 4 and 5, an orthogonal projection image (an example of a projection image) of the outer shape of the tag 7 projected onto the outer surface of the sidewall portion 2 is illustrated as a tag projection image 7s. As illustrated in FIG. 4, in this embodiment, the indicator 8 is formed in an area that includes the outer surface of the sidewall portion 2 and encompasses the tag projection image 7s. In this embodiment, the orthogonal projection image of the outer shape of the tag 7 projected onto the surface of the sidewall portion 2, i.e. the tag projection image 7s is an image of projecting the outer shape of the tag 7 onto the surface of the tire 100 closest to the center of the tag 7 (in this embodiment, the outer surface of the sidewall portion 2), in a direction along the normal from the center of the tag 7 to the said outer surface.

The indicator 8 may be formed in the area that encompasses the tag projection image 7s (see FIGS. 2 and 4) on the surface of the tire 100, as illustrated in FIGS. 3 to 5. The position of embedment of the tag 7 within the tire 100 can be thereby indicated in a direction orthogonal to the surface of the tire 100. In other words, the tag 7 can be removed from the tire 100 by hollowing out the tire 100 (in this embodiment, the sidewall portion 2) in a direction orthogonal to the surface.

As illustrated in FIGS. 3 to 5, the indicator 8 is preferably formed, in the surface of the tire 100, in an area that encompasses the tag projection image 7s (see FIGS. 2 and 4) and is wider than the tag projection image 7s. This makes it possible, when the tag 7 is removed from the tire 100, to remove the tag 7 from the tire 100 more reliably by hollowing out the area in which the indicator 8 is formed. In other words, the tag 7 can be reliably removed using the entire area indicated by the indicator 8 as an object of separation.

The indicator 8 is preferably formed of a material (different-colored material) with a different color from the other parts in the tread portion 3. This allows the indication of the indicator 8 to be clearly distinguished by the difference in color. The different color means that there is a difference in saturation, tone, brightness, pattern, gloss, or the like, such that the difference can be visually recognized, i.e., there is visual distinguishability. The different-colored material includes materials that emit or store light. This embodiment illustrates a case in which a different-colored portion 87 is formed as the indicator 8. The different-colored material may be made by adding, to rubber, pigment of a different color from the other parts, or by removing carbon from rubber.

In addition to providing the visual distinguishability of the position or area using the different color from the other parts in the tread portion 3, the indicator 8 may also indicate the depth of embedment of the tag 7 by its color (saturation, tone, brightness, pattern, gloss, or the like). This can indicate how deep the tag 7 is embedded from the surface of the tire 100. In other words, the tag 7 can be removed from the tire 100 by hollowing out the tire 100 to the depth indicated by the indicator 8. For example, when the indicator 8 is yellow, the depth is 1 mm or more and less than 5 mm from the surface, and when the indicator 8 is blue, the depth is 5 mm or more and less than 15 mm from the surface.

In addition to indicating the depth of embedment of the tag 7 by its color (saturation, tone, brightness, pattern, gloss, or the like), the indicator 8 may also indicate the depth of embedment of the tag 7 by its shape. For example, when the indicator 8 is drawn as a double ellipse, the depth is 1 mm or more and less than 5 mm from the surface, and when the indicator 8 is drawn as a double rectangle, the depth is 5 mm or more and less than 15 mm from the surface.

The different-colored portion 87, as the indicator 8, may be simply colored on the surface of the tire 100, but as illustrated in FIG. 3, is preferably formed from the surface of the tire 100 (in this embodiment, the outer surface of the sidewall portion 2) to within the tire 100. In other words, the different-colored portion 87, as the indicator 8, is preferably formed such that the different-colored material with a predetermined thickness is embedded in the surface of the tire 100. This can prevent a reduction in the distinguishability of the indicator 8, even when the tire 100 has been used to some extent and the surface is worn.

In this embodiment, the different-colored portion 87 is formed over an area that is from the outer surface of the sidewall portion 2 (the outer surface of the tire 100) to within the tire 100 and on the outer surface side (in this embodiment, outside in the width direction W) from the tag 7.

Second Embodiment

A tire 100 according to a second embodiment is different from the tire 100 according to the first embodiment in the disposition of the tag 7 and the indicator 8, and is otherwise the same.

Figure 6:
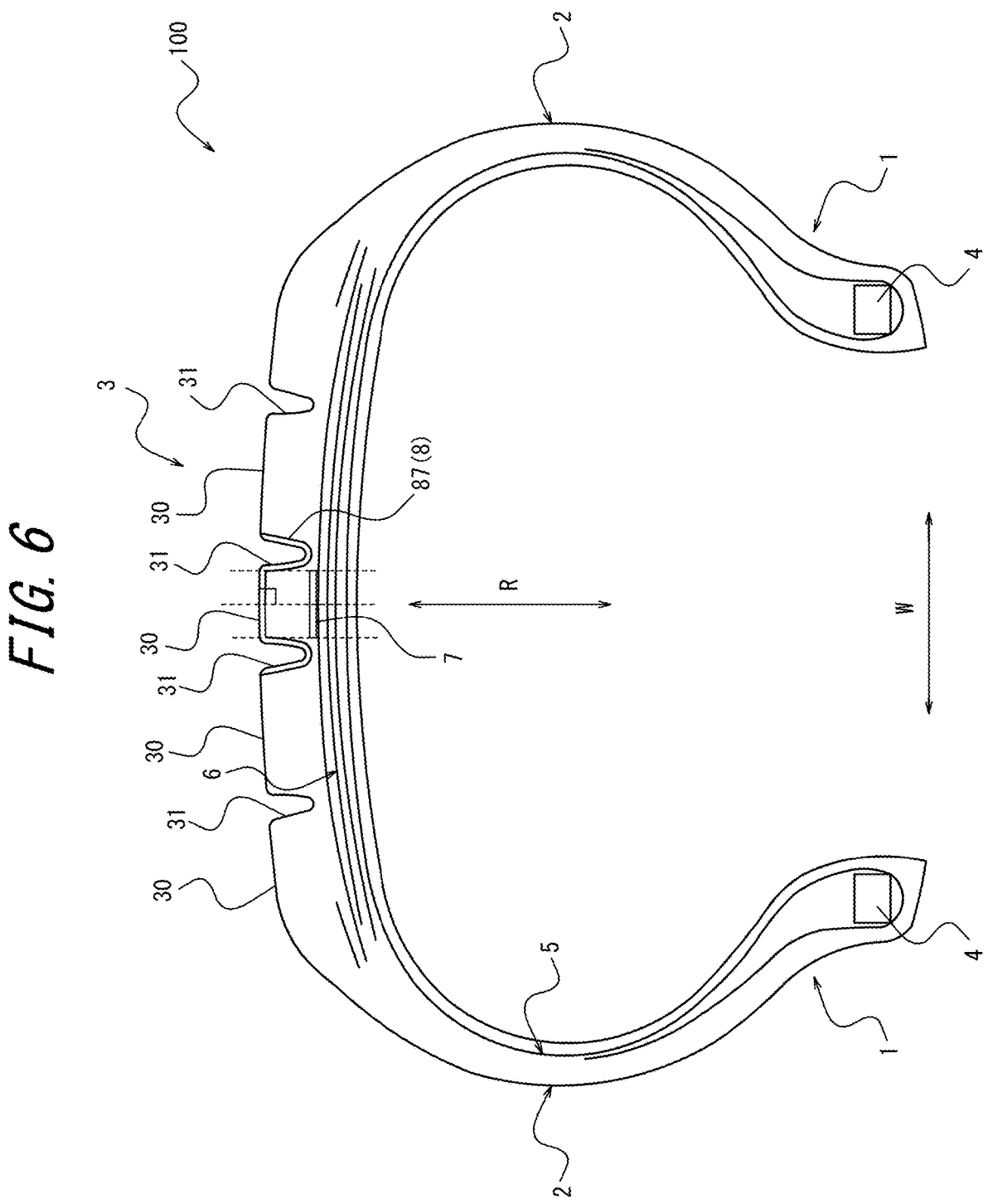
FIG. 6 is a cross-sectional view of a tire according to a second embodiment, in a cross-section intersecting a circumferential direction of the tire and in a cross-section of a part including an indicator.
Figure 7:
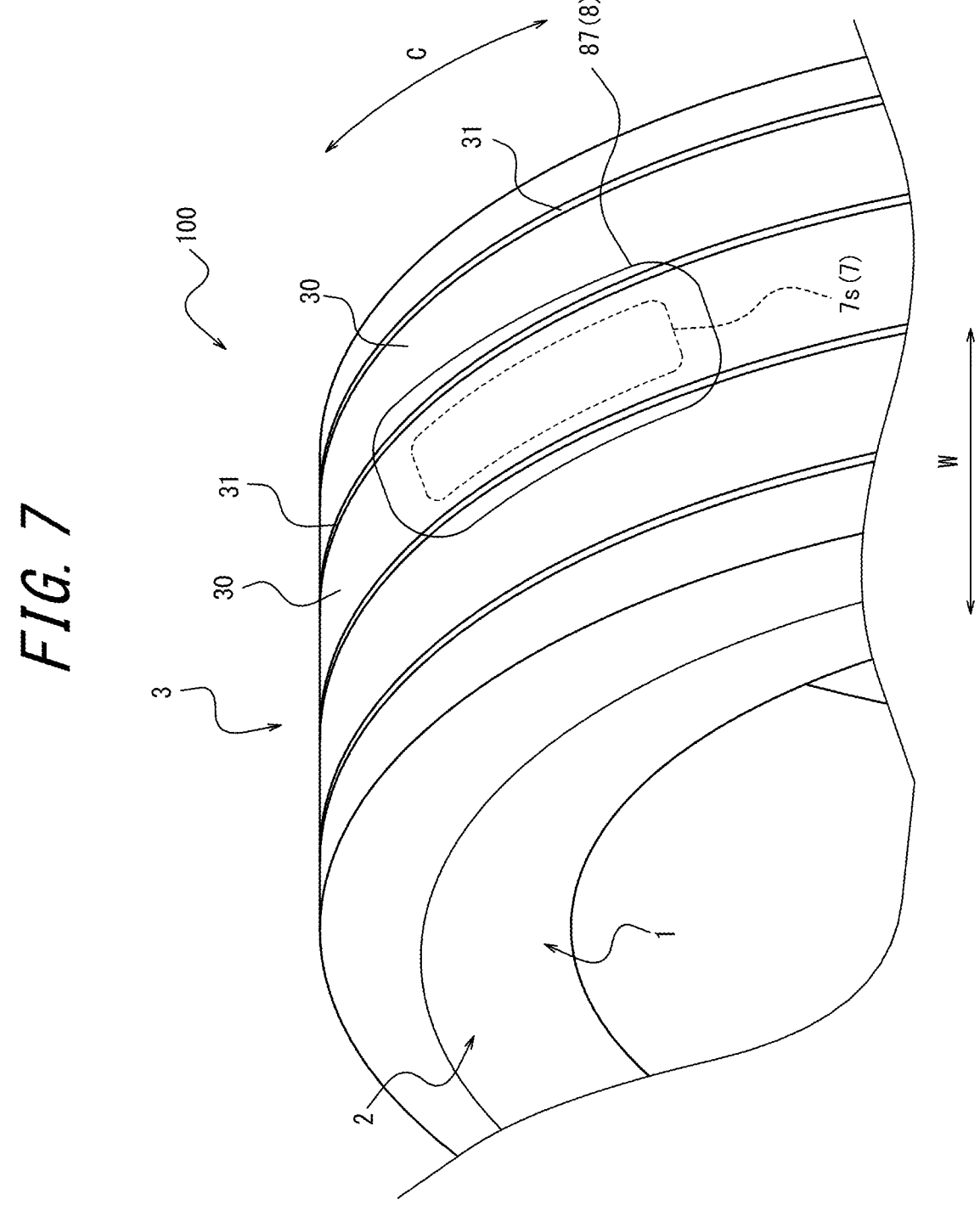
FIG. 7 is a perspective view of the tire according to the second embodiment.

In the tire 100 according to this embodiment, as illustrated in FIGS. 6 and 7, the tag 7 is embedded within the tire 100 in the tread portion 3 and outside from the carcass 5 in the radial direction R.

As illustrated in FIGS. 6 and 7, the indicator 8 is disposed in such a position that the normal from the position of the tag 7 to an outer surface of the tread portion 3, which is the outer surface of the tire 100 closest to the tag 7, intersects the said outer surface. In this embodiment, the different-colored portion 87, as the indicator 8, is disposed over an area that encompasses the tag projection image 7s (see FIG. 7) and is wider than the tag projection image 7s. In other words, as illustrated in FIG. 7, the different-colored portion 87 is disposed over the wider area than the tag projection image 7s in the circumferential direction C and the width direction W. In this embodiment, the different-colored portion 87 is disposed, in the width direction W, over a middle convex portion 30 of the tread portion 3, in which the tag projection image 7s is positioned, and concave portions 31 on both sides of the said convex portion 30 in the width direction W.

The different-colored portion 87, as the indicator 8, may be simply colored on the surface of the tire 100, but as illustrated in FIG. 6, is preferably formed from the surface of the tire 100 (in this embodiment, the outer surface of the sidewall portion 2) to within the tire 100. In other words, the different-colored portion 87, as the indicator 8, is preferably formed such that the different-colored material with a predetermined thickness is embedded in the surface of the tire 100. This can prevent a reduction in the distinguishability of the indicator 8, even when the tire 100 has been used to some extent and the surface is worn.

The different-colored portion 87 may be formed even thicker than illustrated in FIG. 6. The thicker the different-colored portion 87 is formed, the more distinguishability of the indicator 8 can be maintained even when the tire 100 is worn. For example, the different-colored portion 87 may be formed over an area that is from a surface of the convex portion 30 to within the inside of the tread portion 3 in the radial direction R (within the tread portion 3) to a depth of valley bottoms of the concave portions 31 (a depth from the outer surface in the radial direction R).

According to the disposition of the indicator 8 illustrated in FIGS. 6 and 7, a part of the indicator 8 is formed over the concave portions 31 so that, even when the convex portion 30 is heavily worn, the indicator 8 in the concave portions 31 remains. Therefore, the indicator 8 can be prevented from losing the distinguishability.

In this embodiment, the different-colored portion 87 is formed over an area that is from the outer surface of the tread portion 3 (the outer surface of the tire 100) to within the tire 100 and on the outer surface side (outside in the radial direction R) from the tag 7.

EXPLANATION OF VARIATIONS

Variations of the above embodiments will be described below.

Variation 1

Figure 8:
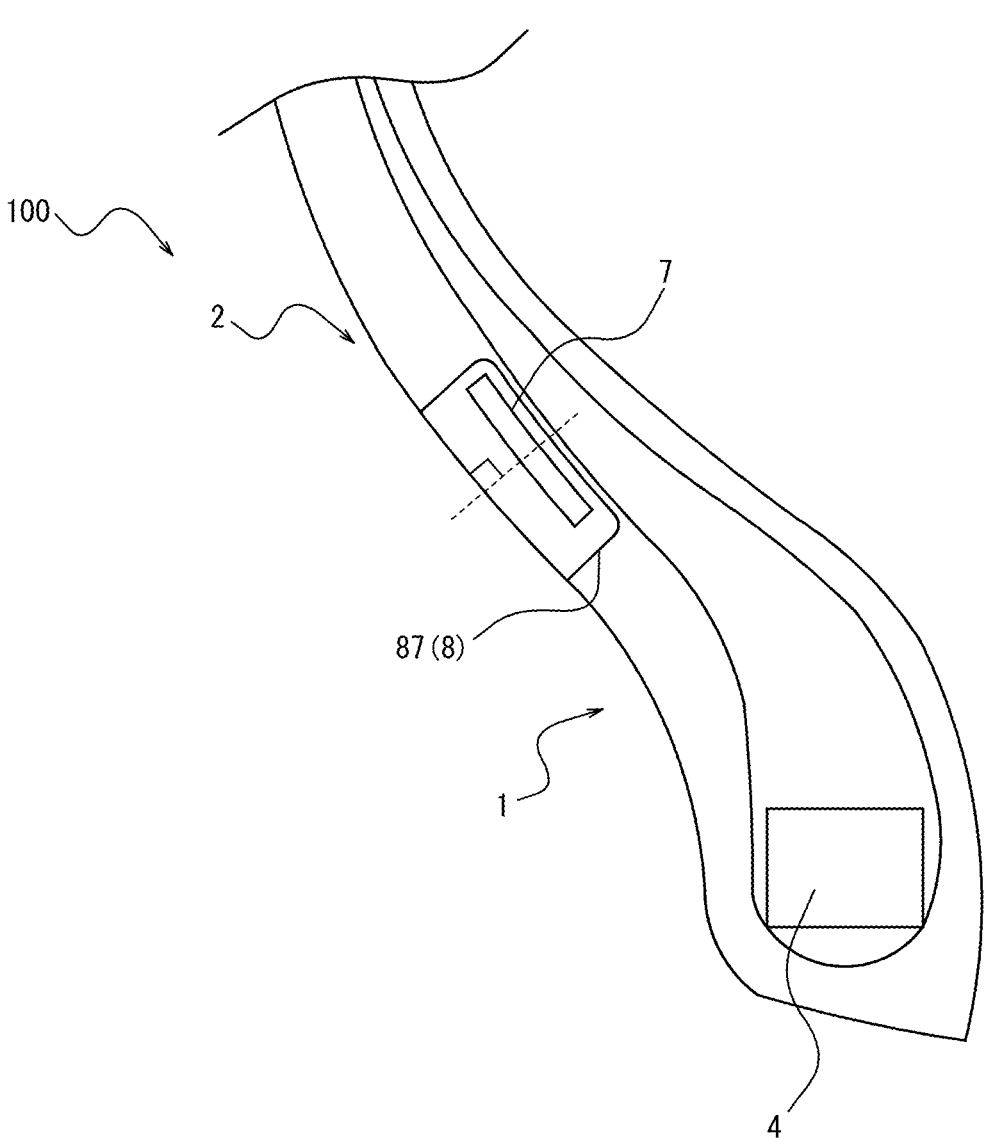
FIG. 8 is an enlarged cross-sectional view in which a part of the sidewall portion of the tire with an indicator of Variation 1 is enlarged.

The above embodiments describe the cases in which the different-colored portion 87, as the indicator 8, is formed over the area that is from the outer surface of the tire 100 to within the tire 100 and on the outer surface side from the tag 7. However, as illustrated in FIG. 8, the different-colored portion 87 may be formed over an area that encompasses (wraps) the tag 7. FIG. 8 illustrates a case in which the different-colored portion 87 illustrated in the first embodiment is modified. Forming the different-colored portion 87 in this manner makes it possible, when the tag 7 is removed from the tire 100, to reliably remove the tag 7 by hollowing out or otherwise removing the entirety of the different-colored portion 87 using the difference in color as a guide.

Variation 2

Figure 9:
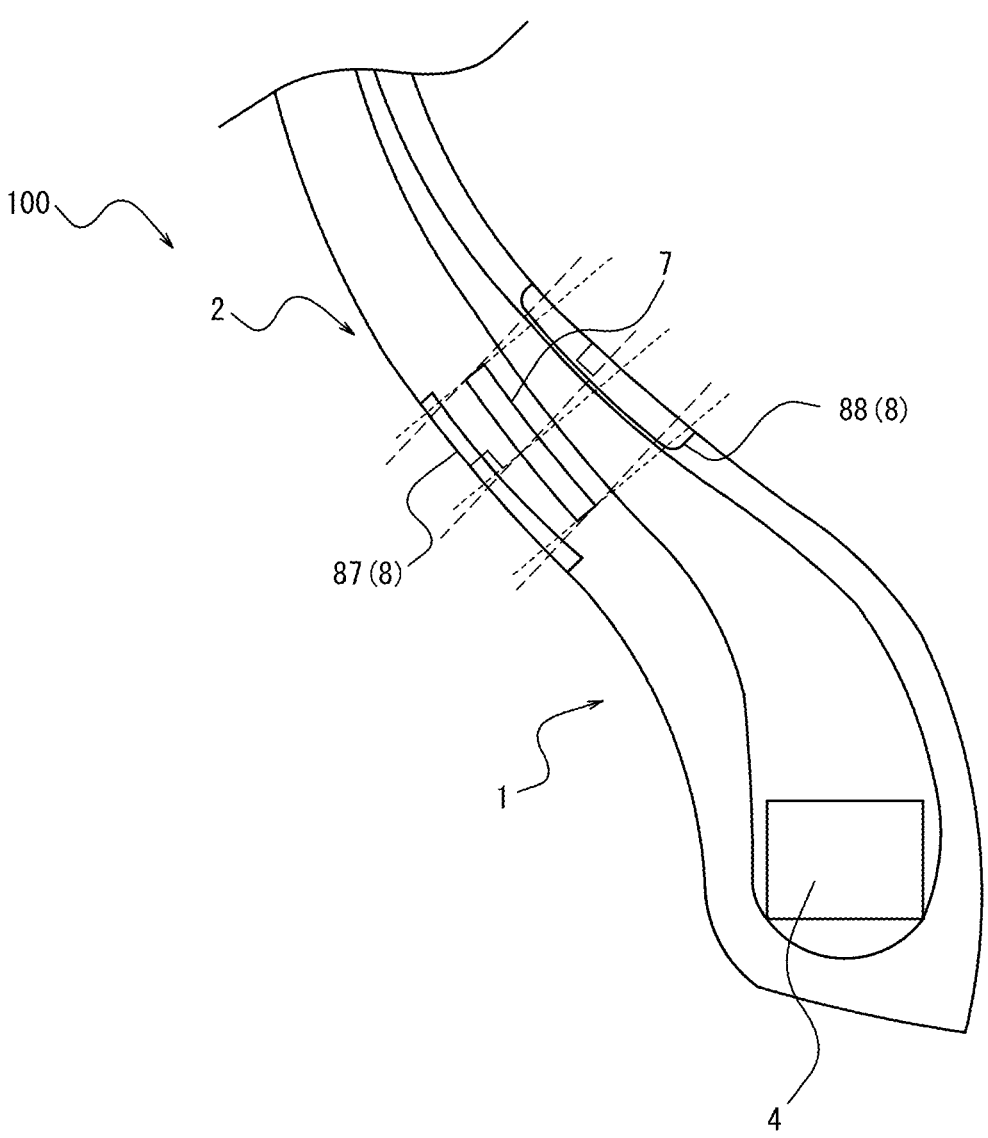
FIG. 9 is an enlarged cross-sectional view in which a part of the sidewall portion of the tire with an indicator of Variation 2 is enlarged.

The above embodiments describe the cases in which the indicator 8 is disposed in such a position that the normal from the position of the tag 7 to the outer surface of the tire 100 closest from the tag 7 intersects the said outer surface. However, the indicator 8 may be disposed in such a position that the normal from the position of the tag 7 to the inner surface of the tire 100 closest to the tag 7 intersects the said inner surface. Specifically, as illustrated in FIG. 9, the indicator 8 may be formed in an area that includes the inner surface of the tire 100 and encompasses an orthogonal projection image of the outer shape of the tag 7 projected onto the inner surface of the tire 100. FIG. 9 illustrates a case in which the indicator 8 illustrated in the first embodiment is modified. That is, FIG. 9 illustrates the case of forming the different-colored portion 87, as the indicator 8, formed on the outer surface of the tire 100 and a second different-colored portion 88, as the indicator 8, formed on the inner surface of the tire 100. Owing to the second different-colored portion 88, the indicator 8 can clearly indicate the area in which the tag 7 is embedded, even on the inner surface side of the tire 100. Therefore, the tag 7 can be removed from the tire 100 by hollowing out the tire 100 from the inner surface side.

Although FIG. 9 illustrates the case in which the different-colored portion 87 and the second different-colored portion 88 are formed, the different-colored portion 87 may not be formed and only the second different-colored portion 88 may be formed. This allows to indicate the area in which the tag 7 is embedded, without affecting the appearance and design of the tire 100 on the outer surface side.

As described above, it is possible to indicate the area in which the electronic tag installed in the tire is embedded.

Other Embodiments (1) The above embodiments have illustrated only the cases in which the different-colored portion 87 and/or the second different-colored portion 88, as the indicator(s) 8, are/is disposed in such positions/a position that the normal from the position of the tag 7 to the surface(s) of the tire 100 closest to the tag 7 intersects the said surface(s). The above embodiments describe the cases in which the indicator(s) 8 indicate(s) the area in which the tag 7 is embedded. However, the indicator 8 may also include an auxiliary indicator that indicates the position at which the tag 7 is embedded, in addition to indicating the area in which the tag 7 is embedded.

Figure 10:
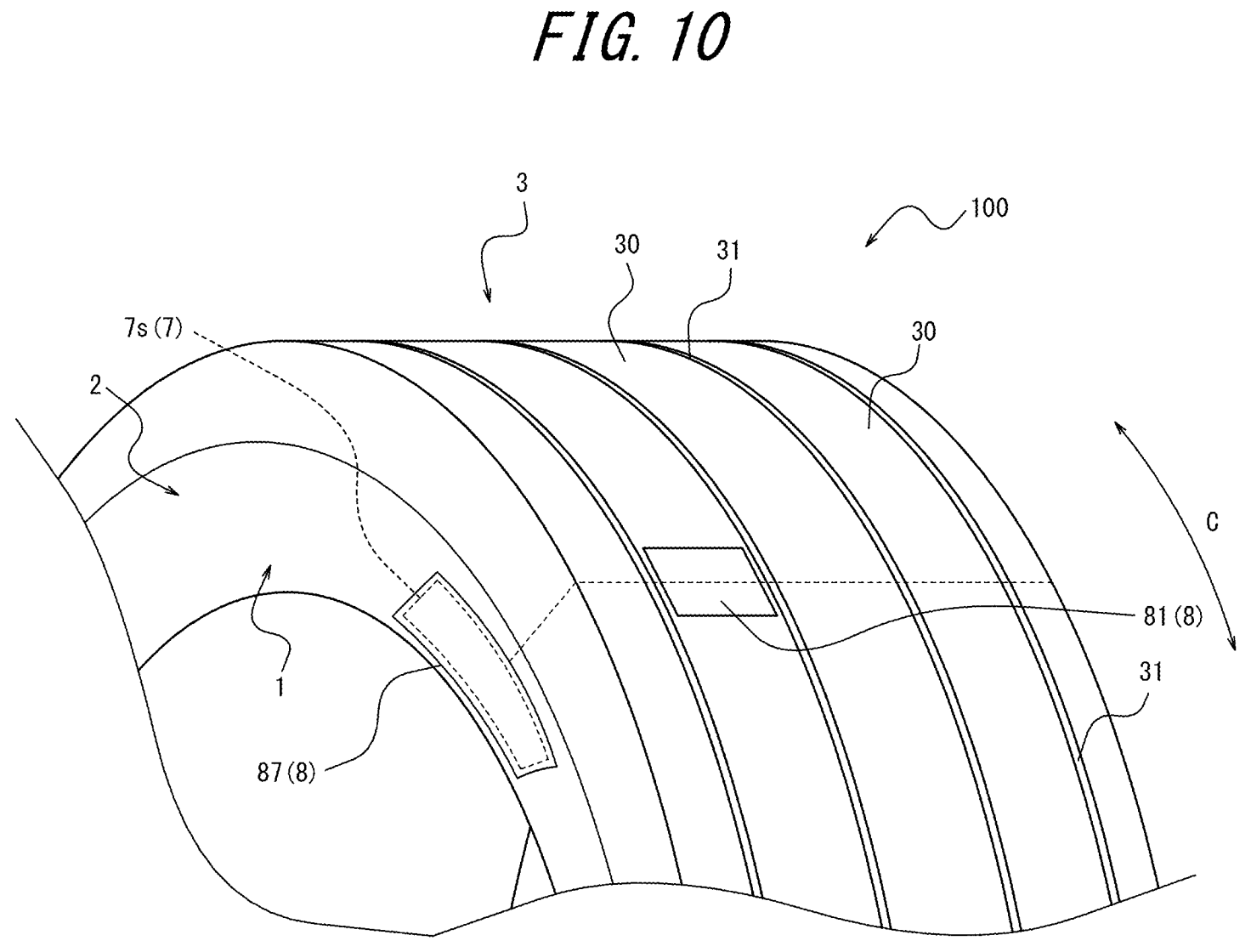

FIG. 10 illustrates a case in which an auxiliary indicator 81, as the indicator 8, is disposed at the same position as the tag 7 in the circumferential direction C of tire 100 and on the surface of tread portion 3. This allows the auxiliary indicator 81, as the indicator 8, to indicate the position of the tag 7 in the circumferential direction C of the tire 100. Note that, the example illustrated in FIG. 10 illustrates the case in which the auxiliary indicator 81 is disposed, in the tread portion 3, on a side closer to the tag 7 in the width direction W. Thereby, the auxiliary indicator 81 further indicates which side in the width direction W the tag 7 is located.

For example, as illustrated in the first embodiment described above, in a case in which the tag 7 is located on the side of the tire 100, for example, when tires 100 are stacked flat, the different-colored portion 87 may be hidden by another adjacent tire. However, by providing the auxiliary indicator 81 on the tread portion 3 too, a worker can easily recognize the position of the tag 7 in the circumferential direction C of the tire 100 using, as a landmark, the auxiliary indicator 81 disposed at the same position as the tag 7 in the circumferential direction C of the tire 100, as long as the tread portion 3 is exposed and visible. Also, using the position of the auxiliary indicator 81 in the width direction W as a clue, it is easy to recognize which side of the tire 100 in the width direction W the tag 7 is located. This further facilitates removal of the tag 7 when the tire 100 is disposed of or recycled. In a case in which the worker performs communication with the tag 7, the worker can easily recognize the position of the different-colored portion 87, i.e., the position of the tag 7, using the auxiliary indicator 81 as a clue, and can smoothly perform communication with the tag 7.

Figure 11:
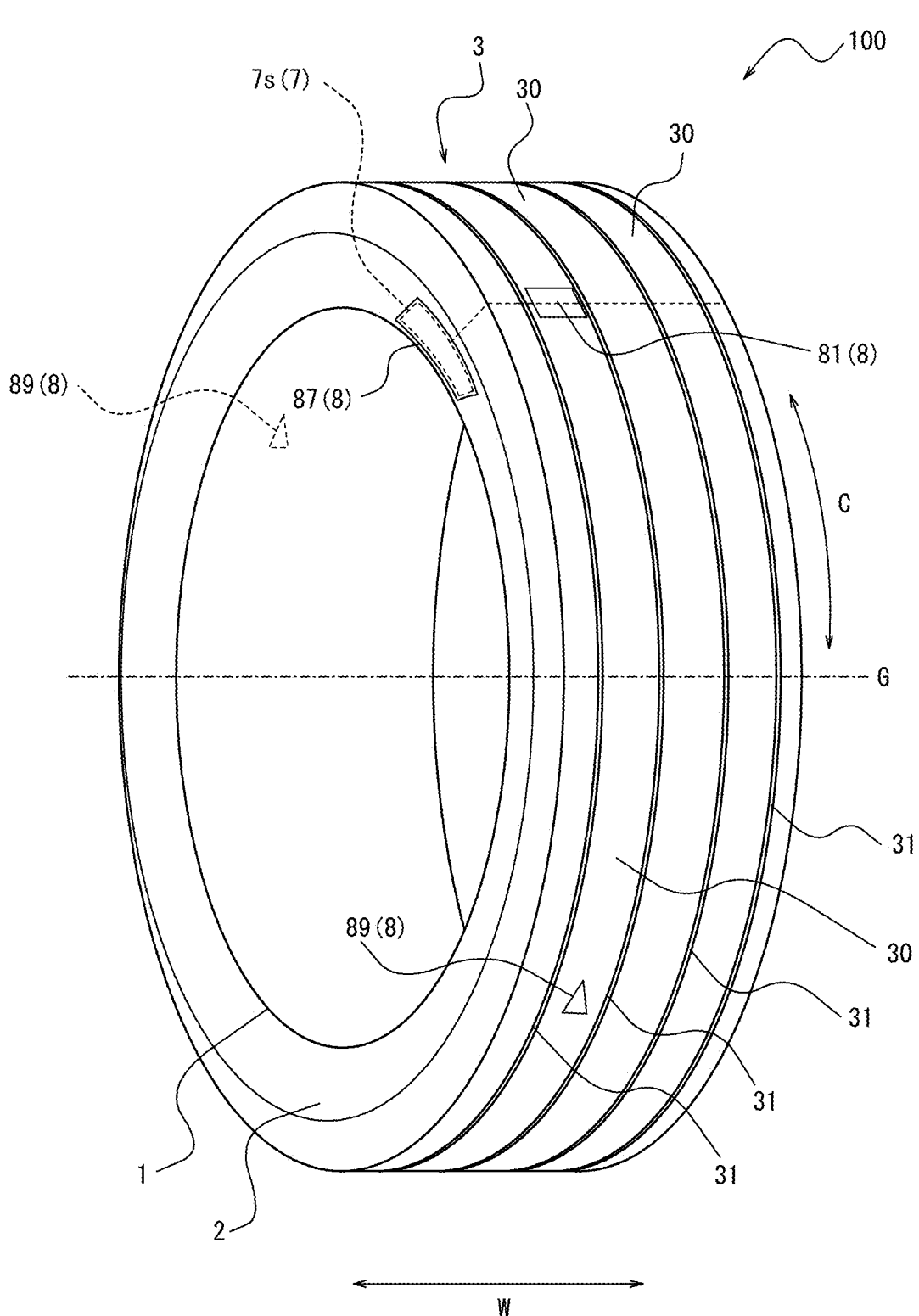
FIG. 11 is a perspective view of another tire.

As illustrated in FIG. 11, directional indicators 89, as the indicators 8, that indicate the position of the tag 7 in the circumferential direction C may be disposed at different locations from the tag 7 in the circumferential direction C of the tire 100.

The example illustrated in FIG. 11 illustrates a case in which the directional indicators 89, 89 are disposed on the outer surface of the tread portion 3, one front and one back in the circumferential direction C of the tire 100 with respect to the same position as the tag 7 in the circumferential direction C of the tire 100. The directional indicators 89 are each formed as an arrow-like indication in the form of a triangle, for example, and indicate the position of the tag 7 in the circumferential direction C of the tire 100. The worker can thereby know the position of the tag 7 in the circumferential direction C of the tire 100 using the directional indicators 89, even when the different-colored portion 87 and the auxiliary indicator 81 are not exposed, and the worker can perform communication with the tag 7 or remove the tag 7 by easily recognizing the position of the different-colored portion 87, i.e., the position of the tag 7 by using these as a clue.

(2) The above embodiments describe the cases in which the tag 7 is embedded in the tire 100, but a part of the tag 7 may be exposed from the inner surface of the tire 100. Even in this case, the different-colored portion 87 or the second different-colored portion 88, as the indicator 8, can indicate the area in which the tag 7 is embedded.

(3) The above embodiments exemplarily describe the cases in which the tag projection image 7s is the orthogonal projection image of the outer shape of the tag 7 projected onto the surface of the tire 100. However, the tag projection image 7s may be a projection image of the outer shape of the tag 7 projected at an included angle onto the surface of the tire 100, i.e., projected obliquely onto the surface of the tire 100. In this case, the different-colored portion 87, as the indicator 8, is preferably formed over an area that encompasses the tag 7.

The configurations disclosed in each of the above embodiments (including the other embodiments, the same hereinafter) can be applied in combination with the configurations disclosed in the other embodiments, as long as no contradiction arises. The embodiments disclosed in this specification are just examples. The embodiments of the present disclosure are not limited thereto, and may be modified as appropriate within the scope not departing from the purpose of the present disclosure.

INDUSTRIAL APPLICABILITY

The present disclosure can be applied to tires.

REFERENCE SIGNS LIST

1 bead portion
100 tire 2 sidewall portion
3 tread portion
30 convex portion
31 concave portion
4 bead core
5 carcass
6 belt
7 tag (electronic tag)
8 indicator
81 auxiliary indicator
87 different-colored portion
88 second different-colored portion
89 directional indicator
C circumferential direction
R radial direction
W width direction

The invention claimed is:

1. A tire comprising:
an electronic tag disposed inside from a surface; and
an indicator indicating a position of the electronic tag,
wherein the indicator is:
    disposed in or on the surface, and
    formed in an area encompassing a projection image of
      a shape of the electronic tag onto the surface, and
      wherein the indicator indicates a depth of embedment of the electronic tag.

2. The tire according to claim 1, wherein the indicator is formed in an area encompassing an orthogonal projection image of the shape of the electronic tag onto the surface.

3. The tire according to claim 2, wherein the indicator is formed over an area encompassing the electronic tag.

4. The tire according to claim 3, wherein the indicator includes an auxiliary indicator indicating the position of the electronic tag in a circumferential direction.

5. The tire according to claim 2, wherein the indicator includes an auxiliary indicator indicating the position of the electronic tag in a circumferential direction.

6. The tire according to claim 1, wherein the indicator is formed over an area encompassing the electronic tag.

7. The tire according to claim 6, wherein the indicator includes an auxiliary indicator indicating the position of the electronic tag in a circumferential direction.

8. The tire according to claim 1, wherein the indicator includes an auxiliary indicator indicating the position of the electronic tag in a circumferential direction.

* * * * *